United States Patent Office 3,469,464
Patented Sept. 30, 1969

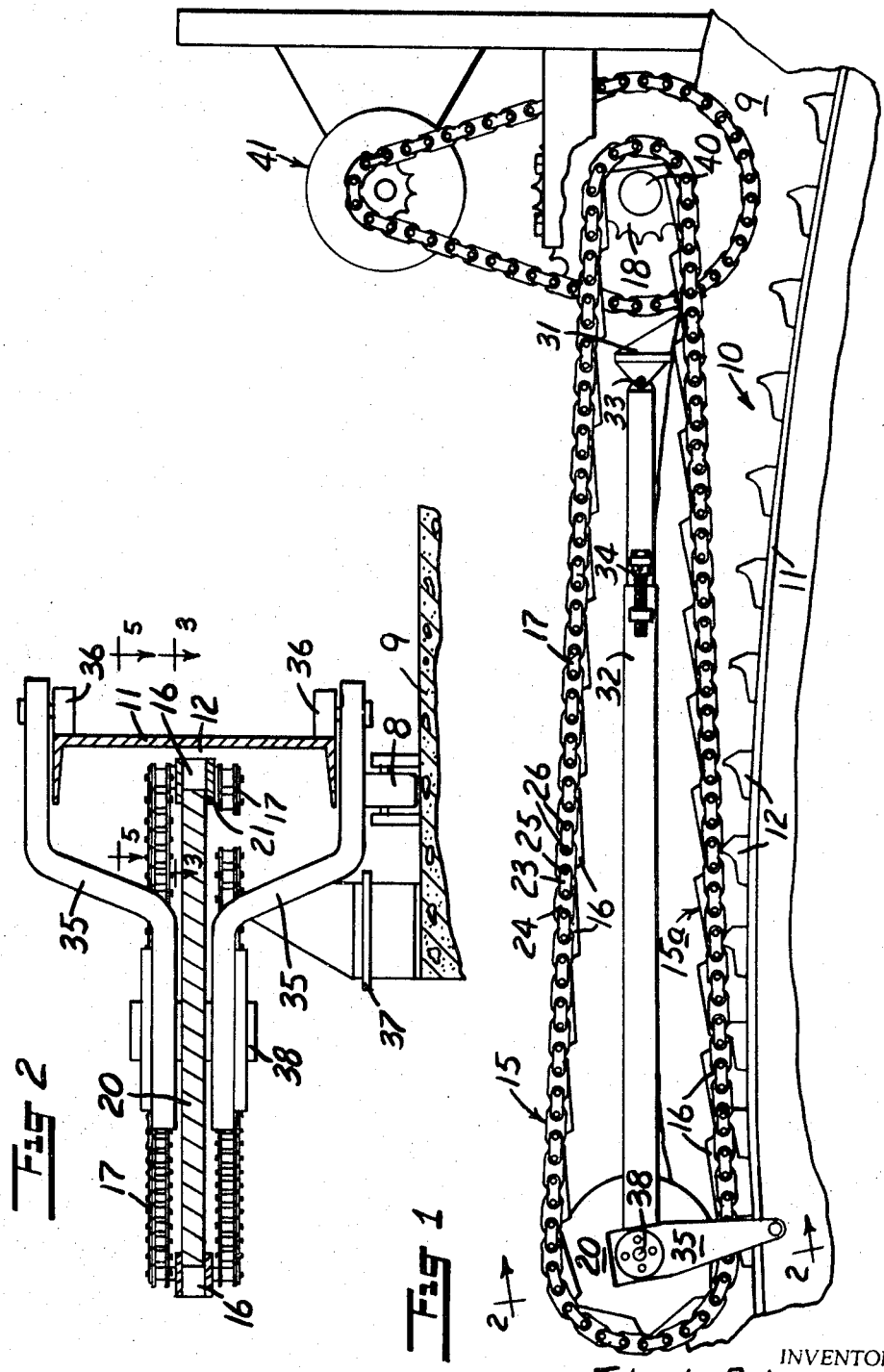

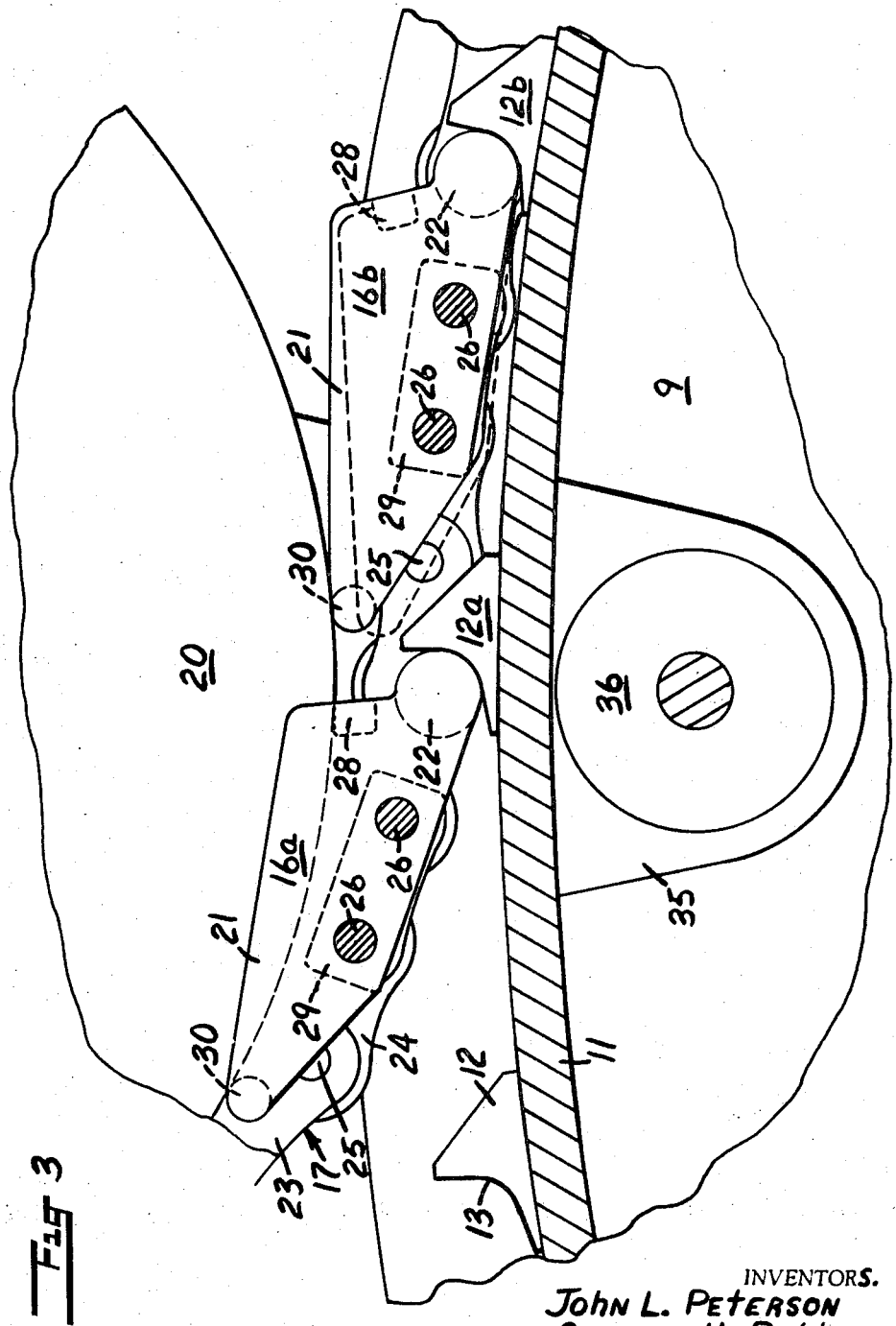

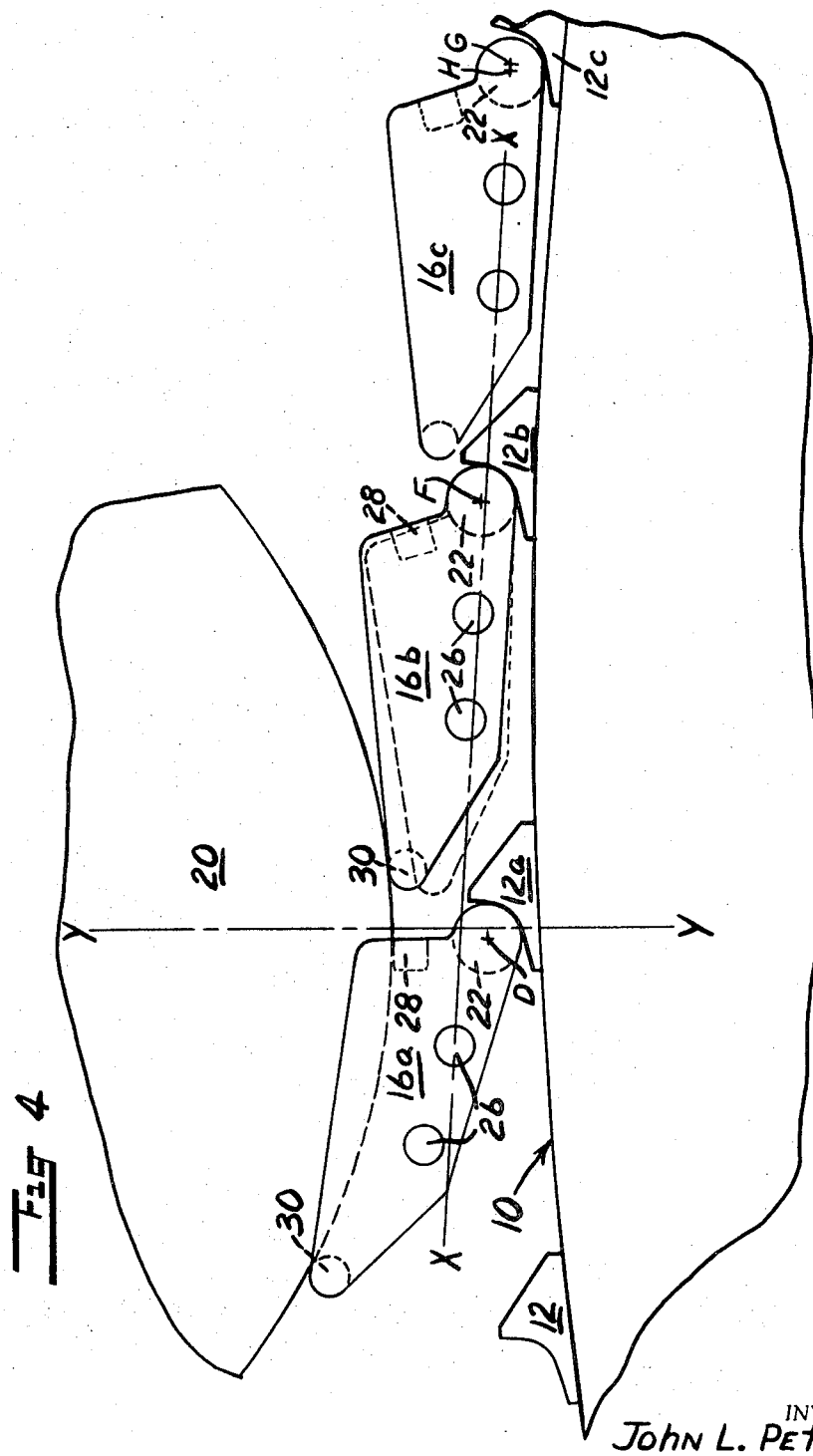

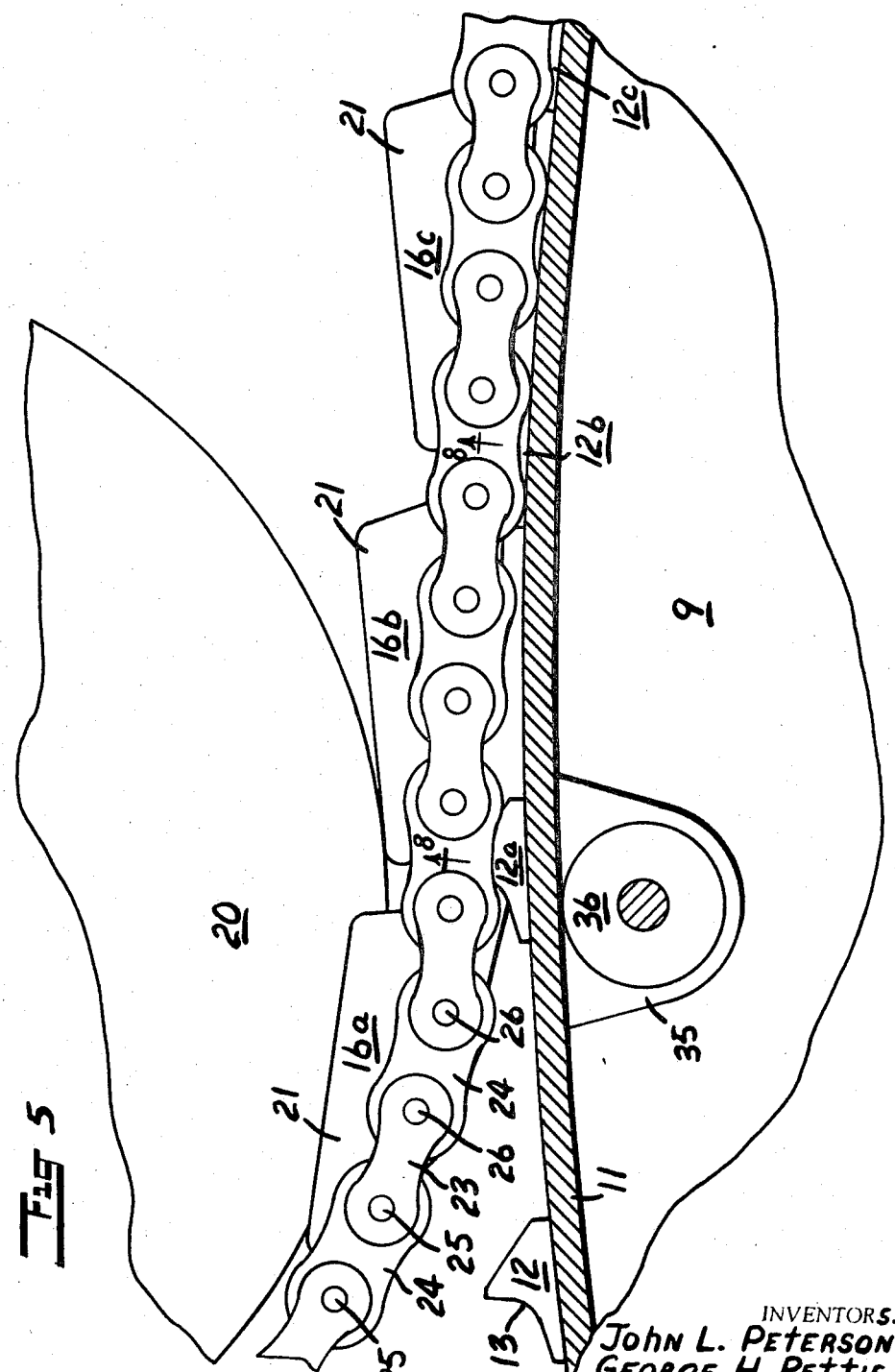

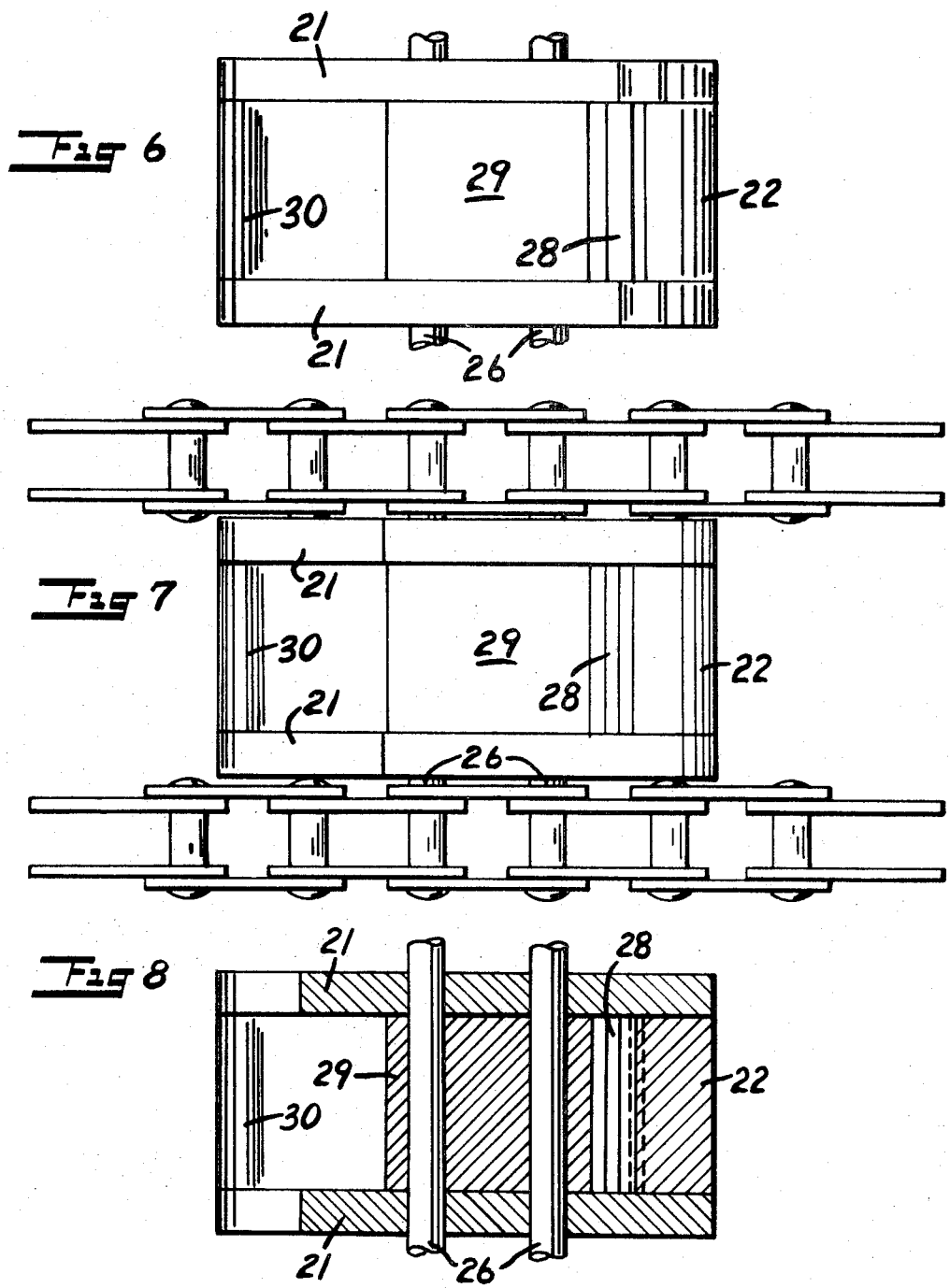

3,469,464
DRIVE MECHANISM INCLUDING CHAIN
John L. Peterson and George H. Pettis, Spokane, Wash., assignors to Atlas Spokane, Inc., a corporation of Washington
Filed June 10, 1968, Ser. No. 735,797
Int. Cl. F16h 21/62, 7/06, 7/18
U.S. Cl. 74—221                                     8 Claims

ABSTRACT OF THE DISCLOSURE

A drive mechanism for an endless driven member wherein power is applied to equally spaced teeth on the driven member by means of dogs carried by a flexible endless chain or other support. The normal pitch of the dogs is slightly less than the pitch of the teeth on the driven member. The spacing between dogs is modified by shift of position of an engaging dog so as to match the tooth pitch during the period in which the dog engages a tooth and takes over the transfer of force to the driven member. The mechanism is designed specifically for high load applications where normal separating forces encountered with equally pitched driving and driven elements result in unacceptable structural requirements, power demands and wear.

BACKGROUND OF THE INVENTION

Field of the invention

The drive mechanism disclosed herein is applicable to the driving of any endless driven element, whether in the form of a circular ring having a rigid nature or in the form of a flexible driven element having a predetermined peripheral configuration. While no particular application of the mechanism is intended to limit the scope of this disclosure, the specific details illustrated have been designed for the powering of a large diameter horizontal ring such as that disclosed in Patent No. 3,011,658 granted to John L. Peterson, titled "Apparatus for Particle Transfer for a Storage Pile."

In such a large scale mechanism subject to varying loads, the transfer of adequate power to a driven ring gives rise to separating forces encountered between a conventional sprocket and chain which leads to serious mechanical difficulties and undesirable power demands. The present apparatus is designed to minimize such problems by providing an elongated path of power transfer along a straight flight of chain, while eliminating the usual separating forces by providing positive disengaging clearance between the driving chain members and the driven teeth on the member.

Another problem with chain to sprocket drives is the difficulty of retaining accurate engagement of the driving and driven members because of the different wear rates of chain and teeth. Generally the chain will wear so that the chain pitch is greater than the sprocket tooth pitch and engagement difficulties are encountered.

Description of the prior art

Prior art patents have shown the driving of a ring by a chain. An example is the patent to Roth 1,423,028 (July 18, 1922) which illustrates the use of a driving chain having a pitch equal to the pitch of the teeth on the driven drum. No mention is made of the separating forces encountered, which presumably were no difficulty because of the nature of the particular load. This apparently holds true also with respect to the disclosure of the Haff Patent 2,793,920 (May 28, 1957), which shows a similar type of drive at FIG. 6. The patent to Haug 1,921,749 (August 8, 1933) illustrates clamping type members on a driving chain which selectively engage and disengage from driven pins on a straight flight of a driven member. While the disengagement of such members might solve the problem of separating forces, the complication of operating such members become increasingly difficult in relatively high load applications.

SUMMARY OF THE INVENTION

The present drive mechanism is used in combination with a driven member that has a plurality of equally spaced tooth surfaces arranged for movement in an endless path, such as a confined flexible belt or rigid ring. It utilizes conventional power means such as a suitable motor and transmission. The power means is drivingly connected to an endless driving member having one moving flight extending along the path of the tooth surfaces along a limited portion of the driven member. A plurality of dogs are mounted on the driving member in such fashion that the paths of these dogs and the tooth surfaces converge at the upstream end of the flight and diverge downstream whereby individual dogs are brought into abutting engagement with the individual tooth surfaces to apply a driving force between the driving member and the driven member. The normal spacing of the dogs along the flight is slightly less than the spacing of the tooth surfaces.

Proper meshing of each dog with a tooth for force transfer is accomplished by a pitch modifying device engageable with the dog during the period in which the application of force to the driven member is being transferred to the dog. The spacing between dogs is increased to match the tooth pitch by modifying the geometry of the path of the dog during engagement with the tooth. This causes the spacing of the dog relative to the dog preceding it along the driving member in the direction of movement of the flight to equal the spacing of the tooth surfaces. After such period, the pitch modifying means permits the spacing between the dogs to return to normal Clearance is thereby provided between the downstream dogs and teeth to permit the path of the dogs to diverge from the paths of the teeth without disengaging or separating forces between these moving members.

One object of this invention is to present a practical apparatus for driving a high-load sprocket member by a tangential chain or flexible member.

Another object is to eliminate the usual difficulties of pitch tolerances encountered in a chain-sprocket drive.

Another object is to minimize wear in a chain-sprocket drive by slightly accelerating each succeeding sprocket tooth so as to push the preceding teeth forward of the corresponding driving members. This minimizes mechanical wear in the system.

These and other objects will be evident from the following disclosure, taken together with the drawings to which it refers. The exemplary structure shown is not to expresely limit the scope of the invention, which is defined in the appended claims.

BRIEF DESCRIPTION OF THE DRAWINGS

FIG. 1 is a plan view looking down upon a portion of a driven member and illustrating the drive mechanism described herein;

FIG. 2 is an enlarged sectional view through the driving and drive members as seen along line 2—2 in FIG. 1;

FIG. 3 is an enlarged fragmentary view taken along line 3—3 in FIG. 2 showing the details of dog engagement;

FIG. 4 is a schematic view similar to FIG. 3 illustrating some of the geometric relationships existing during the transfer of driving force from one dog to the next;

FIG. 5 is an enlarged fragmentary view taken along line 5—5 in FIG. 2 showing the chain and dog configuration;

FIG. 6 is a top view of a dog;

FIG. 7 is a bottom view of a dog; and

FIG. 8 is a sectional view through a dog along line 8—8 in FIG. 5.

DESCRIPTION OF PREFERRED EMBODIMENT

The preferred embodiment of this drive mechanism is illustrated with relation to the movement of a driven member generally indicated by the numeral 10. While not restricted to such form, the driven member 10 is shown specifically as a large diameter ring 11 provided with a plurality of teeth 12 fixed about its periphery. While not so limited, teeth 12 protrude radially outward from ring 11. The teeth 12 are each identical to one another and are equally spaced within acceptable tolerances about the entire periphery of the ring 11, it being understood that only a portion of ring 11 is shown in the drawings for illustrative purposes. The ring 11 is supported by rollers 8 on a concrete slab 9. Ring 11 can be supported by any suitable bearing or roller supporting device and can be loosely mounted as shown for limited "floating" lateral movement or can be mounted for rotation about a fixed axis relative to the supporting structure.

Each tooth 12 is provided with a concave surface extending across the rear face of the tooth and indicated by numeral 13. The rear surface 13 is smooth and should preferably be hardened in order to permit the application of force thereto.

The driving member 15 is illustrated as an endless chain drive means, having a moving flight indicated at 15a which extends along the path of the tooth surfaces 13 across a limited portion of the driven member 10. The flight 15a is illustrated as a straight flight, it being desirable that the flight 15a diverge from the path of movement of teeth 12 on the driven member 10. However, the path of the teeth 12 might be a straight line instead of being curved as illustrated, in which case the flight 15a might itself be curved to provide the divergent relationship. Additionally, the flight 15a might be straight and the path of the teeth 12 might also be straight in a parallel direction along the engaging portions of the drive mechanism, so long as one or both elements is directed outwardly from the other prior to downstream interferences between the engaging devices.

The driving member 15 essentially comprises a plurality of interconnected dogs 16 which selectively abut the teeth 12 for the application of motive force. Dogs 16 are individually mounted between a pair of roller chains 17 of conventional construction. The chains 17 are powered by drive sprockets 18 fixed to a shaft 40 which in turn is powered by a suitable motor and transmission unit 41 by means of a driving chain apparatus designed to meet the speed and power requirements of a particular application.

The portions of chains 17 opposite to those portions which engage the drive sprockets 18 are supporting through dogs 16, which in turn engage the periphery of a circular idler wheel 20.

The driving member 15 is shown as being supported in a predetermined relationship to the ring 11, which is capable of limited lateral movement in the preferred form of this device. A fixed mount 31 is shown carried by slab 9. An extensible arm 32 is pivotally connected at 33 to the mount 31 for pivotal movement about an axis parallel to the rotational axis of ring 11. Assuming the upper surface of slab 9 is to be in a horizontal plane, the axis of pivot 33 will be vertical. Adjustment bolts 34 are connected between the two telescoping portions of the extensible arm 32 to selectively lock arm 32 in any desired length relationship, this being essential in order to provide proper tension along chains 17. The outer end of arm 32 is provided with a yoke 35 including upper and lower arms which straddle ring 11 and which extend inwardly beyond its inner periphery. The weight of yoke 35 is supported by a horizontal bearing 37 which also accommodates free movement of the yoke 35 in any horizontal direction. A pair of rolls 36 are provided on the yoke 35, the respective rolls 36 being vertically aligned and being in engagement with the inner surface of ring 11. The yoke 35 is held in a constant spatial relationship with respect to the ring 11 by the pressure of dogs 16 against the teeth 12, which is countered by the pressure of the rolls 36 against the inner periphery of ring 11. The yoke 35 rotatably supports a shaft 38 which in turn carries the idler wheel 20. The axis of idler wheel 20 is also parallel to the rotational axis of ring 11.

The peculiar nature of the driving dogs 16 and their relationship to teeth 12 can best be understood by reference to FIGS. 3 to 8. In FIGS. 3, 4 and 5 the dog 16a shown at the left is illustrated at the position at which maximum driving force is applied thereby to the tooth 12a and dog 16b is illustrated in full lines in its position immediately prior to the release of driving pressure between it and the preceding tooth 12b. At the next instant of operation, dog 16b will achieve the position shown in dashed lines, being aligned in the normal straight line configuration along flight 15a. Dog 16c is shown downstream in FIG. 4 fully released from engagement with the corresponding tooth 12c.

Each dog 16 comprises a pair of parallel side plates 21 spaced from one another by interior spacer blocks 29. Each dog 16 is movably mounted with respect to the chains 17 by two extended length pins 26 which replace the normal pivot pins that connect the overlapping chain link members 23, 24. The connections between the ink members 23, 24 intermediate the extended pins 26 are provided by conventional pins 25.

At the forward end of each dog 16 is an abutment bar 22 which is fixed to and extends between the plates 21. The center of the cylindrical bar 22 is shown as being coincident with the axis of the pin 25 outwardly adjacent to the front end of dog 16 when the dog 16 is in a straight line position along flight 15a, but this relationship is not critical in the dog design.

The angular relationship of the dogs 16 relative to chains 17 apart from the straight line configuration along the unrestricted flights is controlled by front and rear abutments 28, 30 which respectively extend across the side plates 21. According to this structure, the center to center spacing or "pitch" between dogs 16 when unrestrained and taut along a straight line flight of chains 117 is slightly less than the center to center spacing or "pitch" along a parallel straight line between adjacent teeth 12. As one example, if the center to center distance between the pins of chains 17 is 1½ inches, the pitch of the dogs is 6 inches and the pitch of the teeth 12 is 6¹⁄₁₆ inches. Referring to FIG. 4, the tooth pitch would be indicated by the distance between center D and center F or between center F and center G. The centers D and F indicate both the respective centers of the abutment bars 22 of the two dogs 16a and 16b and the centers of curvature of the concave rear surfaces 13 of the respective teeth 12a and 12b. Center G represents the corresponding center of tooth 12c, the corresponding bar center for dog 16c being designated at H. Again referring to FIG. 4, the plane through the axes of pins 25 and 26 along flight 15a when unrestricted by contact of the dogs with the idler wheel 20 or teeth 12 is indicated by line X—X. When the dogs 16a and 16b are moved downstream along flight 15a and are aligned along line X—X to the position shown at 16c, the center to center separation of the dogs is slightly less than the center to center separation of the teeth 12. The separation of dogs and teeth increases progressively downstream along flight 15a, providing the required physical clearance between the dogs 16 and the teeth 12 to permit their paths to diverge without creating separating forces.

As illustrated in FIG. 4, the inclination of dog 16a at the time during which it is taking up the application of driving force to tooth 12a is such that the center to center spacing relationship between dogs 16a and 16b (distance D–F) equals the pitch of the teeth 12 (distance D–F or F–G). This is accomplished without stretching chains 17 due to the deviation of the dogs 16 from the usual tangential position where center D would be located on line X—X. The increased spacing can be geometrically explained by reference to FIG. 4. As shown, the center of the forward pin 26 of dog 16a is aligned along line X—X, along with the centers of pins 26 and center H of dog 16c, providing maximum straight line pull through the medium of chain flight 15a. A slight deviation from line X—X is noted with respect to the corresponding centers of dog 16b just prior to release of driving pressure thereby. This is due to the overlap of flight 15a along the circular path of teeth 12, this flight 15a being tangential to the path of teeth 12 at a location downstream from line Y—Y drawn through the centers of idler wheel 20 and ring 11.

The geometric deviation of center D outward from line X—X in relation to the center of idler wheel 20 is such as to make it possible for dog 16a to engage behind a tooth 12 for driving engagement with ring 11. It will then remain in such engagement until the succeeding dog becomes so engaged, permitting its rear abutment 30 to drop free of engagement against idler wheel 20 as shown in dashed lines in FIGS. 3 and 4. At that moment, the progressing separation differential between teeth and dogs will become effective as the tooth advances downstream ahead of the corresponding dog. The dog is then capable of diverging from the tooth path free of further mechanical rubbing or engagement.

To further analyze this structure, it is evident from FIG. 1 that the normal positions of dogs 16 along the straight flight 15a is such that the abutments provided by abutment bars 22 are aligned along a straight path. This path might be coincident with the path of the chain as shown, or parallel to such path depending upon the chosen offset designed into a particular dog structure. However, at the upstream end of flight 15a (shown at the left in FIG. 1) the coaction of the periphery of idler wheel 20 and each dog engaged thereby is such as to cause the front end of the dog or the abutment thereof, to protrude outwardly beyond the line of this normal path in a direction toward the driven ring 11, resulting in an increase in the spacing between the abutment surface of that dog and the corresponding surface of the preceding dog, which is substantially located along the normal path of movement.

As the dog 16a comes around the guide 20, it is forced by the abutment 28 to take a position where its bar 22 lies well beyond its normal position along the line of pull X—X of the chains 17. It is thus made to engage behind tooth 12a which is 1/16 inch behind 12b, that is being advanced by the bar 22 on the dog 16b. As the advance continues the rear pin 26 of the dog 16a is forced down into alignment with line X—X by the continued engagement of abutment 30 with the guide 20. This effects forward movement of the bar 22 of dog 16a with respect to the advancement of the bar 22 of the dog 16b thus shifting the load gradually from dog 16b to dog 16a until both pins 26 of the dog 16a are on the pull line X—X. When this occurs the succeeding dog will be at the position to start taking the load.

One advantage of this pitch modification of the dogs 16 relative to teeth 12 is that the mechanism automatically compensates for wear in chain 17 to the limit of the pitch variance between each dog. Such wear will reduce the pitch differential along flight 15a, but the desired free downstream clearance will still permit force-free divergence of the dog and tooth paths. This is in contrast to equally pitched driving and driven members overlapping one another, where such wear would increase the tooth separating forces, and make smooth, efficient meshing difficult.

While an idler wheel 20 has been illustrated as the pitch modifying device at the upstream end of flight 15a, it is to be understood that other mechanisms might be substituted. One possibility would be a conventional sprocket assembly and stationary cams along a portion of flight 15a for controlling the angular relationship of dogs 16 and their path of movement. While the wheel 20 revolves, the circular periphery of it is in effect a guide surface which is fixedly located relative to the driven member 10, and could therefore be replaced by an equivalent surface or element which would similarly coact with dogs 16.

Obviously many dimensional and structural changes can be made with respect to the detailed example given herein without deviating from the basic concept of pitch modification between a driving and driven element. Therefore, these details are not to control or restrict the scope of the invention.

Having thus described our invention, we claim:
1. In a drive mechanism having:
   a driven member having an endless succession of protruding teeth mounted thereon for movement along a predetermined path, said teeth being equally spaced about said driven member, the improvement comprising:
   a flexible driving member having an endless succession of equally spaced dogs mounted thereon, said driving member having a powered flight wherein the path of dogs along said flight overlaps a portion of the path of the teeth on said driven member, the normal spacing of said dogs along said flight being slightly less than the spacing of said teeth;
   and means operatively engageable with said dogs for increasing the spacing of one dog along said flexible driving member relative to the immediately preceding dog as said one dog drivingly abuts a teeth, so as to permit meshing engagement of said dog and tooth.
2. A mechanism as set out in claim 1 wherein said last-named means comprises:
   a dog engaging element having a guide surface fixedly located relative to said driven member;
   each dog being engageable with said guide surface at the upstream end of said powered flight, the guide surface having a configuration such so a dog engaged thereby will protrude outwardly beyond the line of said flight in a direction toward said driven member.
3. A mechanism as set out in claim 1 wherein said last-named means comprises:
   a rotatable wheel fixedly located relative to said driven member;
   each dog being engageable with said wheel at the upstream end of said powered flight, the wheel having a surface configuration thereon engaged by said dogs such that a dog engaged thereby will protrude outwardly beyond the line of said flight in a direction toward said driven member.
4. A mechanism as set out in claim 1 wherein each dog comprises
   a solid structure including a forwardly facing abutment for engagement with a tooth;
   said driving member comprising a roller chain assembly, each dog being mounted to said roller chain assembly in such manner that the forwardly facing abutments thereof will be normally aligned in a substantialy straight path along said powered flight;
   said last-named means comprising an element operatively engageable with each dog at the upstream end of said powered flight for causing the forwardly abutment of each dog so engage to protrude beyond said path in a direction toward said driven member.

5. A mechanism as set out in claim 4 wherein said last-named element is a rotatable wheel having the periphery thereof engaged by said dogs.

6. A mechanism as set out in claim 1 wherein said driving member comprises:
 a roller chain assembly including pivotally connected links joined by transverse pins,
 each dog being mounted on said chain assembly by a plurality of said pins;
 tension means mounting said chain assembly for maintaining the straight flight thereof in tension in order that the dogs along said flight will normally be aligned identically in a straight path;
 said last-named means comprising an element operable engageable with each dog at the upstream end of said straight flight for causing each dog so engaged to deviate from said path in a direction toward said dirven member.

7. A mechanism as set out in claim 1 wherein the path of said dogs and the path of said teeth diverge downstream of the portion of the path of said teeth overlapped by the path of said dogs along said powered flight.

8. In combination with a driven member having a plurality of equally spaced transverse surfaces arranged for movement in an endless predetermined path, the improvement in a cooperative drive mechanism, comprising:
 motive power means;
 endless drive means operatively connected to said motive power means, said drive means having one moving flight thereof extending along the path of said surfaces along a limited portion of said driven member;
 a plurality of driving dogs mounted on said drive means, the path of said dogs and said surfaces being convergent at the upstream end of said flight and being divergent downstream along said flight whereby individual dogs are selectively brought into abutting engagement with individual surfaces for the application of diriving forces between said drive means and said driven member, the normal spacing of said dogs along said flight being slightly less than the spacing of said surfaces;
 and pitch modifying means operatively engageable with an individual dog during the period in which the application of force to said driven member is being transferred to said dog for causing the spacing of said dog relative to the dog preceding it along said drive means in the direction of movement of said flight to equal the spacing of said surfaces of said driven member and for permitting such spacing to return to that normal for said dogs along said flight at the conclusion of said period.

References Cited
UNITED STATES PATENTS

| | | | |
|---|---|---|---|
| 1,847,152 | 3/1932 | Webb et al. | |
| 1,903,488 | 4/1933 | Stibbs. | |
| 2,530,786 | 11/1950 | Rose | 74—221 |
| 2,578,675 | 12/1951 | Daniels | 74—221 |
| 2,741,133 | 4/1956 | Barski et al. | 74—216.5 |
| 3,400,540 | 9/1968 | Cresswell et al. | 74—221 XR |

FRED C. MATTERN, Jr., Primary Examiner

J. A. WONG, Assistant Examiner

U.S. Cl. X.R.

74—229, 245